(12) United States Patent
Kraft et al.

(10) Patent No.: US 6,938,170 B1
(45) Date of Patent: Aug. 30, 2005

(54) SYSTEM AND METHOD FOR PREVENTING AUTOMATED CRAWLER ACCESS TO WEB-BASED DATA SOURCES USING A DYNAMIC DATA TRANSCODING SCHEME

(75) Inventors: Reiner Kraft, Gilroy, CA (US); Jussi Petri Myllymaki, San Jose, CA (US); Joann Ruvolo, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 1008 days.

(21) Appl. No.: 09/617,460

(22) Filed: Jul. 17, 2000

(51) Int. Cl.[7] ............ G06F 7/00; G06F 17/21; G06F 17/30; H04L 9/32
(52) U.S. Cl. ............ 713/201; 707/5; 709/203; 713/189; 715/523
(58) Field of Search ............ 707/5, 9, 101; 709/203, 236; 713/189, 190, 193, 194, 200, 713/201; 715/523

(56) References Cited

U.S. PATENT DOCUMENTS

| | | | | |
|---|---|---|---|---|
| 5,918,013 | A * | 6/1999 | Mighdoll et al. | 709/217 |
| 6,006,328 | A * | 12/1999 | Drake | 713/200 |
| 6,192,475 | B1 * | 2/2001 | Wallace | 713/190 |
| 6,195,698 | B1 * | 2/2001 | Lillibridge et al. | 709/225 |
| 6,334,189 | B1 * | 12/2001 | Granger et al. | 713/200 |
| 6,668,325 | B1 * | 12/2003 | Collberg et al. | 713/194 |

OTHER PUBLICATIONS

Daniel Fisher, "Spiders and Lies," Forbes Magazine, Jan. 24, 2000.
Avi Rappaport, "Racing the Engines: The Informortics Search Engines Meeting, 1999," Searcher 7, 7, Jul.-Aug., 1999/46.

* cited by examiner

Primary Examiner—Gregory Morse
Assistant Examiner—Matthew Heneghan
(74) Attorney, Agent, or Firm—Samuel A. Kassatly

(57) ABSTRACT

A protection system and associated method prevent the automatic crawler access to a company's web-based data, without impacting the ability of an interactive user, such as a consumer, to access the data and to conduct regular business transactions. In one embodiment, the protection system will not prevent the crawler from downloading data; rather, the data will be rendered non-extractable by the crawler. In another embodiment, the protection system will prevent crawler access to the data. To this end, the protection system uses any one or a combination of the following six transcoding techniques: Transcoding technique that changes the web page structure; transcoding technique that changes the web page content; transcoding technique that selectively changes web page variable names; transcoding technique that selectively converts text to images in the web page; transcoding technique that alters form values when executed; and/or transcoding technique that generates a substantial portion of, or the entire web page when executed.

18 Claims, 10 Drawing Sheets

SYSTEM AND METHOD FOR PREVENTING AUTOMATED CRAWLER ACCESS TO WEB-BASED DATA SOURCES USING A DYNAMIC DATA TRANSCODING SCHEME

FIELD OF THE INVENTION

The present invention relates to the field of data processing, and particularly to web crawling technology. More specifically, this invention pertains to a computer software product for preventing crawlers from automatically accessing web-based data sources.

BACKGROUND OF THE INVENTION

The World Wide Web (WWW) is comprised of an expansive network of interconnected computers upon which businesses, governments, groups, and individuals throughout the world maintain inter-linked computer files known as web pages. Users navigate these pages by means of computer software programs commonly known as Internet browsers. Due to the vast number of WWW sites, many web pages have a redundancy of information or share a strong likeness in either function or title. The vastness of the unstructured WWW causes users to rely primarily on Internet search engines to retrieve information or to locate businesses. These search engines use various means to determine the relevance of a user-defined search to the information retrieved.

The authors of web pages provide information known as metadata, within the body of the hypertext markup language (HTML) document that defines the web pages. A computer software product known as a web crawler, systematically accesses web pages by sequentially following hypertext links from page to page. The crawler indexes the pages for use by the search engines using information about a web page as provided by its address or Universal Resource Locator (URL), metadata, and other criteria found within the page. The crawler is run periodically to update previously stored data and to append information about newly created web pages. The information compiled by the crawler is stored in a metadata repository or database. The search engines search this repository to identify matches for the user-defined search rather than attempt to find matches in real time.

A conventional crawling operation 200 will now be briefly explained in connection with FIG. 2. A typical web crawler starts at block 201 by performing two main operations in order to execute the crawling process, namely, the access—retrieval of a document (block 202) and then the analysis phase of the document, also called the summarization process (block 204). Today's web crawler might be able to access a dynamically generated document, that is a document generated through executable code (e.g. CGI using Perl, ASP, C, or C++) on the web server.

Oftentimes, web designers embed an executable client side software code in the dynamic documents, so that eventually the code will be replaced with content or generates content on the client side. Examples of this executable code include computation results that are originated based on some user input, or specific text based on the client's web browser version used. More generally, dynamic documents rely on a web browser's capabilities to:

a) retrieve additional documents (block 206) as needed or required, such as frames, in-line images, audio, video, applets, or equivalents;

b) execute client side script (block 208) and code, such as JavaScript® or equivalents;

c) furnish a fault tolerant HTML filter to recognize various HTML standards and interpret HTML markup errors; unscramble content that a web designer has purposefully scrambled in order to thwart crawling and other programmatic analysis methods, to produce a final HTML markup (block 210); and d) integrate all the previously obtained results to render the document (block 212) for presentation to a user (block 214).

A typical search engine has an interface with a search window where the user enters an alphanumeric search expression or keywords. The search engine sifts through available web sites for the user's search terms, and returns the search of results in the form of HTML pages. Each search result includes a list of individual entries that have been identified by the search engine as satisfying the user's search expression. Each entry or "hit" may include a hyperlink that points to a Uniform Resource Locator (URL) location or web page.

Current web technology is being increasingly used for publishing and delivering mission-critical information to consumers, customers, suppliers, and other entities. The extreme ease with which web data can be formed and published has been instrumental to the success and rapid adoption of the Internet as a preferred communication platform.

As explained herein, crawlers have been developed to automatically retrieve data from various web sites. The data may be used internally (e.g. competitive analysis) or externally (e.g. news feed aggregation). Crawlers can pose concerns to companies that publish their products and services on their web sites, desiring to make the data available to customers, to the exclusion of third parties aiming at invading the companies' own published data to entice customers away from these companies. Price data in particular, constitute sensitive information and a primary source of contention, since these data change frequently and can be the foundation of a price-leadership strategy.

There is currently no adequate mechanism by which the content of web pages can be protected from invading crawlers, without impacting the rendering of the web content to legitimate customers. This problem is further exacerbated by the difficulty in detecting crawlers and discriminating between crawler and web browser requests. The need for such a mechanism and corresponding process has heretofore remained unsatisfied.

SUMMARY OF THE INVENTION

The present protection system and associated method satisfy this need by making it significantly difficult, if not impossible for a crawler to automatically access and/or extract the company's web-based data. The present invention achieves this goal without impacting the ability of an interactive user, such as a consumer, to access the company's web-based data and to conduct regular business transactions.

For example, a customer using a web browser to access the company's web-based data, particularly price data, would still be able to access and interpret the data, while an automatic crawler will not be able to automatically process the data, even if the crawler were successful in accessing the data. In one embodiment, the protection system of the present invention will not prevent the crawler from downloading data. Rather, the data will be rendered non-extractable or automatically non-processable by the crawler.

The foregoing and further features and advantages of the present invention are achieved by any one of the following six transcoding techniques (e.g. software programs, algorithms, schemes, or processes), or by various combinations of these techniques:

The first transcoding technique involves dynamically changing the structure of a web form. Certain crawlers extract data by searching a web page for specific HTML elements and use them as anchors. This crawling technique will cause the search to fail or to produce invalid results if the structure of the page were modified every time a web server sends the page to a client.

The second transcoding technique involves dynamically changing the content of a web form. Certain crawlers extract data by searching a web page for a keyword or phrase. Then, using the location of this keyword or phrase as an anchor, the crawlers extract the content data. Keyword searching can be prevented by inserting characters or images between the letters of the keyword or phrase that are invisible to an interactive user.

The third transcoding technique involves dynamically changing the names of form variables. Certain crawlers submit queries by hard-coding the names of form variables in URLs or the body of a POST message. However, these crawlers will fail if the names of the form variables are changed every session. A session may be established when the user visits the web site for the first time in a given time interval, such as the first visit of the day. Alternatively, every access to the web site may be viewed as a separate session.

The web server adds the session ID (identification) to the web form, which can then be extracted and used to compute synthetic names for the original form variables. The session ID is passed to the web user (crawler or browser) and the client passes the session ID back when the form is submitted. This allows the transcoding proxy to re-compute the original name from the synthetic name. Computing synthetic names generates fake (random, or meaningless) names for form variables. It utilizes a key in the generation of the fake names. The key is a session identifier, representing a session between a client and the server. The session ID is embedded within the web form. Recomputing the original names includes restoring the original names from the fake names and the key. The key again, is the session ID, and passed from the web client when the form is submitted.

The fourth transcoding technique involves using dynamic images to display text data. Many crawlers exclusively search the textual content of web page. These crawlers ignore inline images, even when these images contain critical text elements. According to this protection technique, the transcoding proxy alters the HTML content of the web page by replacing text elements with their image counterparts on the fly, thereby preventing a crawler from detecting the text elements.

The fifth transcoding technique involves using an executable application such as JavaScript® to dynamically alter form variable names and content. Many crawlers exclusively search the static HTML code of the web page. According to this technique, pages that contain forms whose variables are initialized or calculated dynamically by a JavaScript® code cannot be effectively crawled because the JavaScript® code would have to be executed in order for the correct values to appear in the form variables.

The sixth transcoding technique involves using an executable application such as JavaScript® to dynamically generate the web page. Many robots exclusively search the static HTML code of the web page. According to this technique, a web server can alter the HTML content of the web page by replacing the static HTML code with JavaScript® code fragments that "print" the HTML content when executed. Alternatively, the HTML content of the web page can be encrypted by the server and decrypted by the JavaScript® code.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF THE INVENTION

Figure 1:
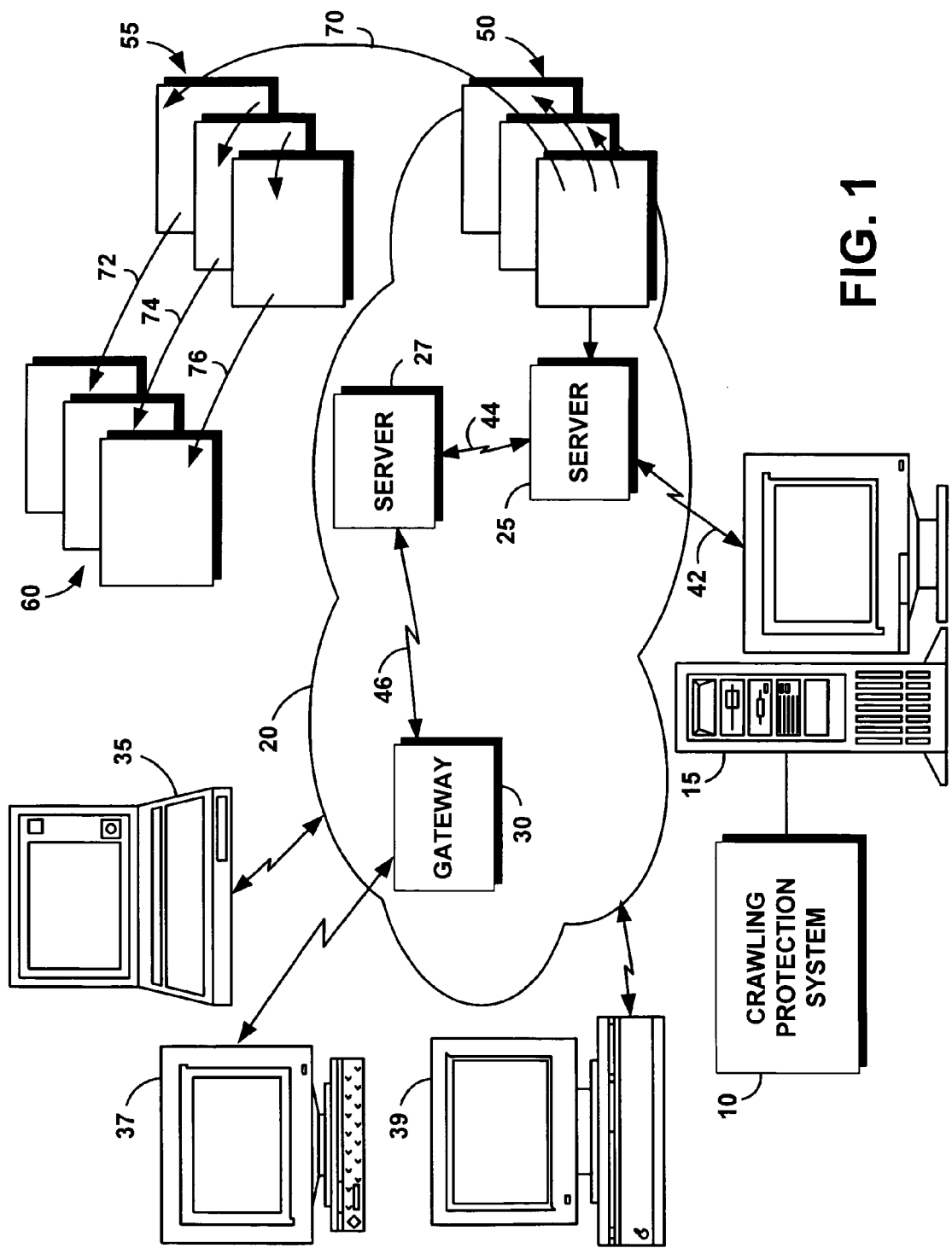
FIG. 1 is a schematic illustration of an exemplary operating environment in which an adaptive advertising system of the present invention can be used.
Figure 2:
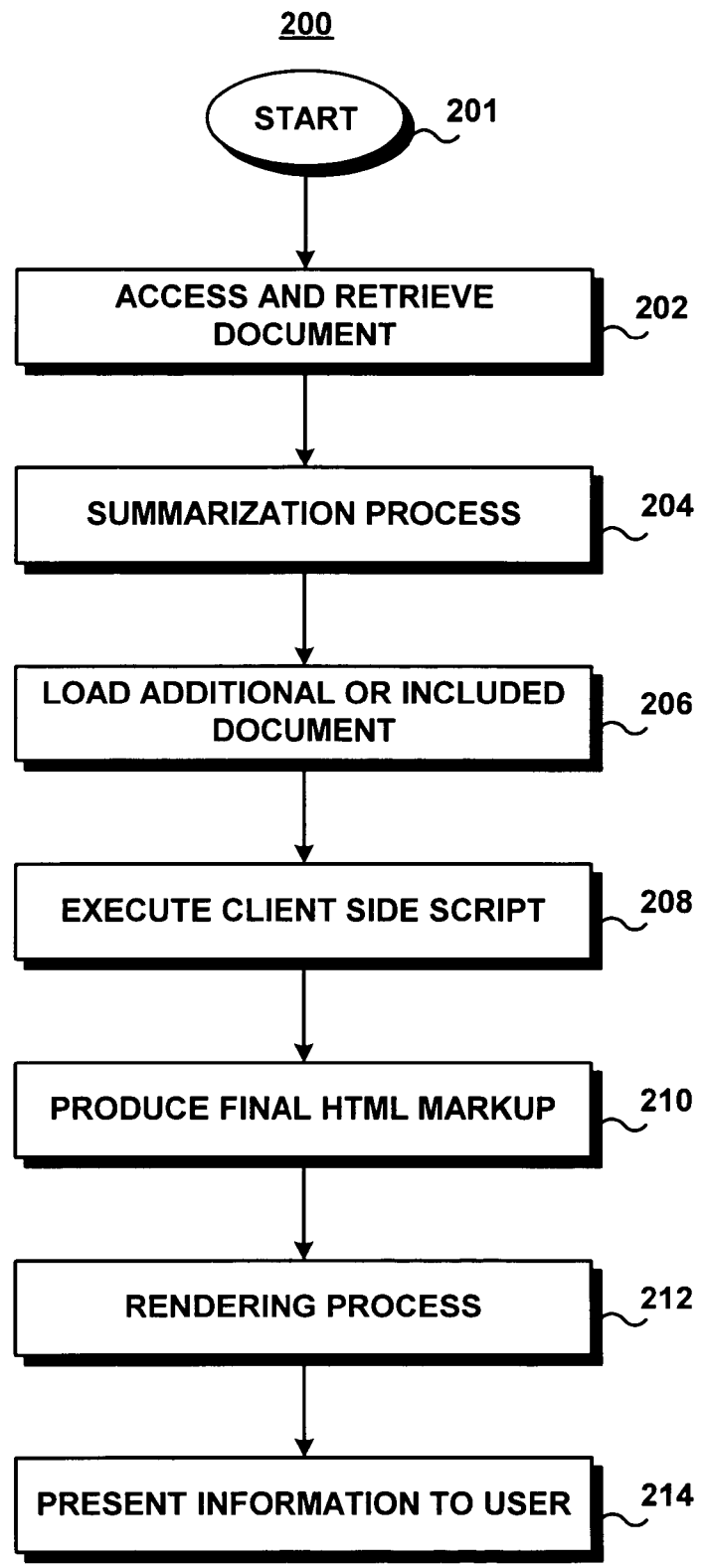
FIG. 2 is a flow diagram of a conventional web crawling or web browsing process.

The following definitions and explanations provide background information pertaining to the technical field of the present invention, and are intended to facilitate the understanding of the present invention without limiting its scope:

Crawler: Also referred to as "robot" or "spider", is a program that automatically explores the World Wide Web by retrieving a document and recursively retrieving some or all the documents that are linked to it.

HTML (Hypertext Markup Language): A standard language for attaching presentation and linking attributes to informational content within documents. During a document authoring stage, HTML "tags" are embedded within the informational content of the document. When the web document (or "HTML document") is subsequently transmitted by a web server to a web browser, the tags are interpreted by the browser and used to parse and display the document.

In addition to specifying how the web browser is to display the document, HTML tags can be used to create hyperlinks to other web documents.

Internet: A collection of interconnected public and private computer networks that are linked together with routers by a set of standards protocols to form a global, distributed network.

Search engine: A remotely accessible World Wide Web tool that allows users to conduct keyword searches for information on the Internet.

Server: A software program or a computer that responds to requests from a web browser by returning ("serving") web documents.

URL (Uniform Resource Locator): A unique address that fully specifies the location of a content object on the Internet. The general format of a URL is protocol://server-address/path/filename.

Web browser: A software program that allows users to request and read hypertext documents. The browser gives some means of viewing the contents of web documents and of navigating from one document to another.

Web document or page: A collection of data available on the World Wide Web and identified by a URL. In the simplest, most common case, a web page is a file written in HTML and stored on a web server. It is possible for the server to generate pages dynamically in response to a request from the user. A web page can be in any format that the browser or a helper application can display. The format is transmitted as part of the headers of the response as a MIME type, e.g. "text/html", "image/gif". An HTML web page will typically refer to other web pages and Internet resources by including hypertext links.

Web Site: A database or other collection of inter-linked hypertext documents ("web documents" or "web pages") and associated data entities, which is accessible via a computer network, and which forms part of a larger, distributed informational system such as the WWW. In general, a web site corresponds to a particular Internet domain name, and includes the content of a particular organization. Other types of web sites may include, for example, a hypertext database of a corporate "intranet" (i.e., an internal network which uses standard Internet protocols), or a site of a hypertext system that uses document retrieval protocols other than those of the WWW.

World Wide Web (WWW): An Internet client—server hypertext distributed information retrieval system.

FIG. 1 portrays the overall environment in which a crawling protection system 10 according to the present invention may be used. The system 10 includes a software or computer program product which is typically embedded within, or installed, at least in part, on a host server 15. Alternatively, the system 10 can be saved on a suitable storage medium such as a diskette, a CD, a hard drive, or like devices. While the system 10 will be described in connection with the WWW, the system 10 can be used with a stand-alone database of documents that may have been derived from the WWW and/or other sources.

The cloud-like communication network 20 is comprised of communication lines and switches connecting servers such as servers 25, 27, to gateways such as gateway 30. The servers 25, 27 and the gateway 30 provide the communication access to the WWW Internet. Users, such as remote Internet users are represented by a variety of computers such as computers 35, 37, 39, and can query the host server 15 for the desired information.

The host server 15 is connected to the network 20 via a communications link such as a telephone, cable, or satellite link. The servers 25, 27 can be connected via high speed Internet network lines 44, 46 to other computers and gateways. The servers 25, 27 provide access to stored information such as hypertext or web documents indicated generally at 50, 55, and 60. The hypertext documents 50, 55, 60 most likely include embedded hypertext link to other locally stored pages, and hypertext links 70, 72, 74, 76 to other webs sites or documents 55, 60 that are stored by various web servers such as the server 27.

Figure 3:
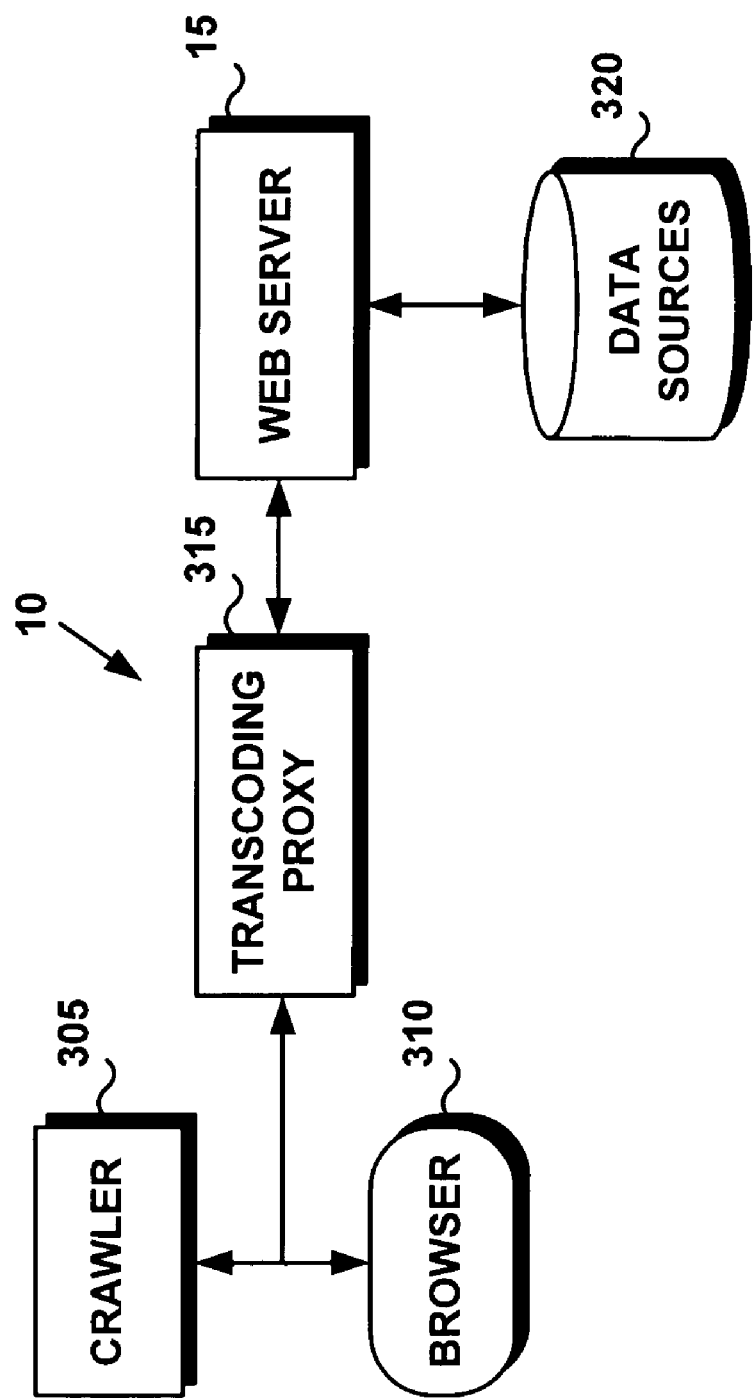
FIG. 3 is a high level architecture of the crawling protection system of the present invention (FIG. 1) showing a transcoding proxy in use in an Internet context.

FIG. 3 illustrates the crawling protection system 10 in use in an Internet context. The system 10 is represented by its main component, the transcoding proxy 315. FIG. 3 further shows a crawler 305 whose operation will be neutralized by the system 10, and a user's browser 310 whose operation will be allowed to proceed unaffected. According to one embodiment, the system 10 permutates the data accessed by the crawler 305 to render them uninterpretable by the crawler 305, while enabling the browser 310 to make use of the data. According to another embodiment, the crawler 305 will not be authorized to access the data, while the browser 310 will be allowed full access. This functional duality is carried out without the system 10 differentiating between the crawler 305 and the browser 310.

Figure 4:
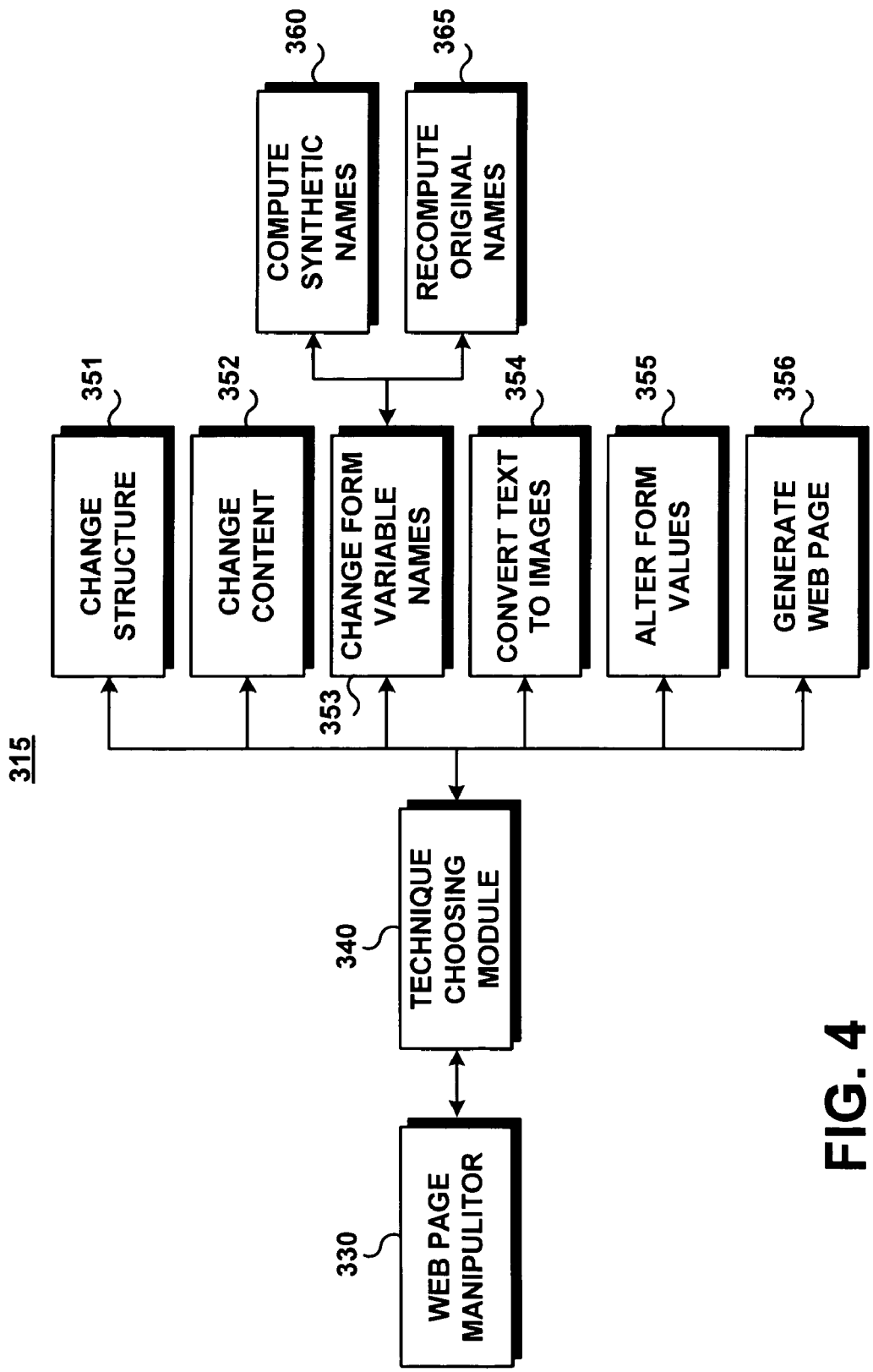
FIG. 4 is a more detailed block diagram of the transcoding proxy of FIG. 3, illustrating six alternative or layered techniques available for use by the crawling protection system of FIG. 3.

FIG. 4 is a more detailed block diagram of the transcoding proxy 315 of FIG. 3, illustrating six alternative or layered techniques 351–356 that are available for use by the crawling protection system 10. The transcoding proxy 315 is generally comprised of a web page manipulator 330, a technique choosing module 340, and one or more protection techniques 351–356.

Figure 5:
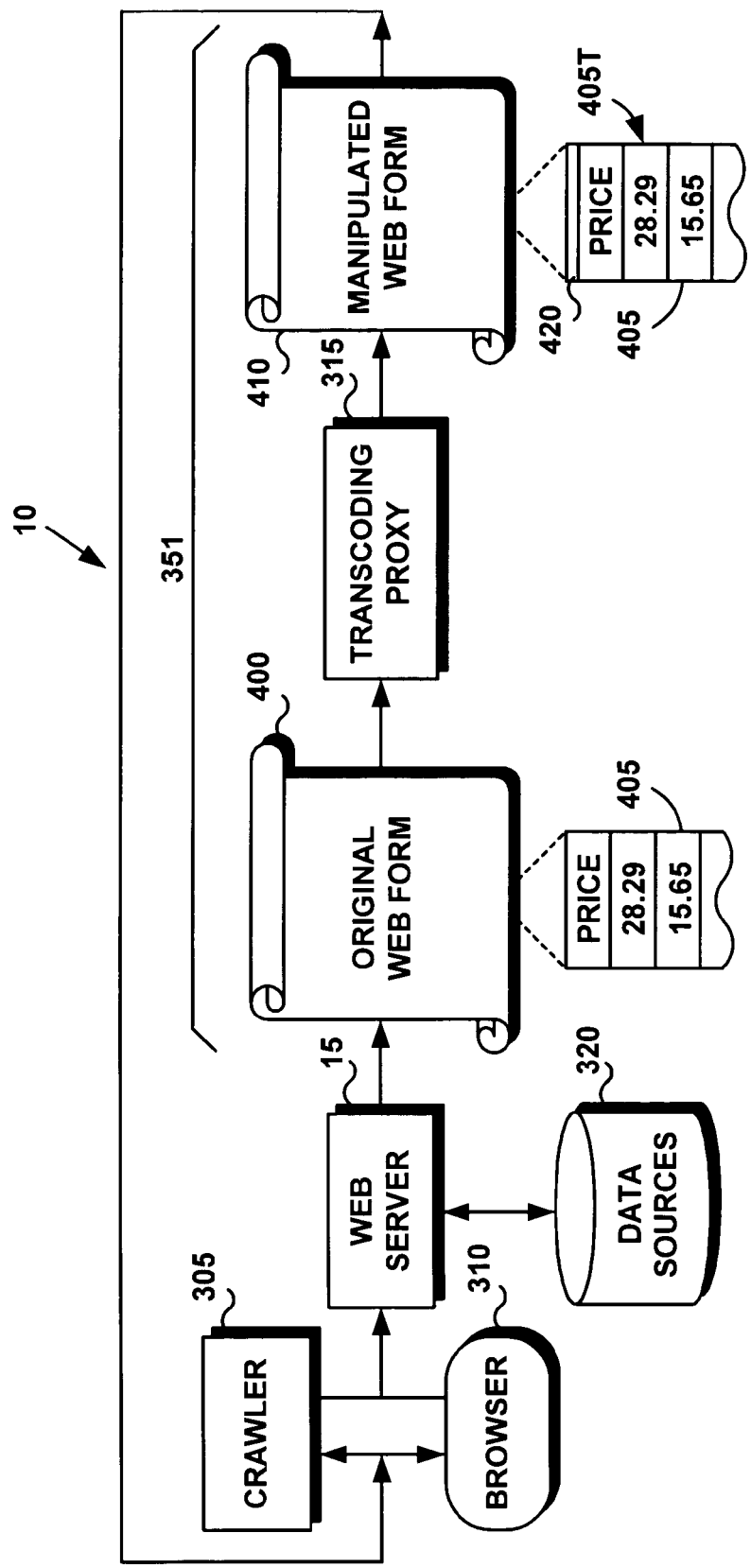
FIG. 5 is a block diagram of the crawling protection system of FIGS. 1 and 3, shown using a first transcoding technique according to the present invention.

With further reference to FIG. 5, the input to the web page manipulator 330 includes an original web form 400 which is generated by the server 15. The original web form 400 contains data from its data sources 320 that are collected and organized in response to a request from either the crawler 305 or the browser 310. Data Sources 320 can include sensitive information, such as price information.

The web page manipulator outputs a dynamically manipulated web form 410 that prevents the crawler 305 from automatically accessing the data embedded in the original web form 400 without impacting the access from the browser 310. The manipulated web form 410 is the form resulting from the dynamic data transcoding of the original web form 400 by the transcoding proxy 315. The transcoding proxy 315 is an intermediary server that dynamically manipulates the original web form 400, using any one or more of the data transcoding techniques 351–356 described herein.

The web page manipulator 330 calls upon a technique choosing module 340 to select one or more of the transcoding techniques 351–356. The technique choosing module 340 keeps track of the various transcoding techniques 351–356, and selects the most appropriate combination to be applied to the original web page 400. One method of choosing the transcoding technique is through random access. The versatility of these techniques 351–356 is important to thwarting undesirable access by crawlers 305. While each of these transcoding technique will be described independently, it should be abundantly clear that one or all of these techniques 351–356 may be applied either simultaneously or sequentially. It should also be clear that the transcoding process is not limited to these six techniques, and that alternative variations can also be used.

The following is a list of the six data transcoding techniques 351–356 that form part of the transcoding proxy 315, and that are used for the prevention (or minimization) of automated crawler access to the web-based data stored in the data repositories 320:

Transcoding technique that changes the web page structure.

Transcoding technique that changes the web page content.

Transcoding technique that selectively changes web page variable names.

Transcoding technique that selectively converts text to images in the web page.

Transcoding technique that alters form values when executed.

Transcoding technique that generates a substantial portion of, or the entire web page when executed.

Several supporting routines can be utilized by the data transcoding techniques 351–356. For example, one particular supporting routine that can be used with the change of form variable names transcoding technique 353 (FIG. 4) invokes the computation of synthetic names (360) from the original names, and the recomputation of the original names from the synthetic names. This routine will be explained later in more detail.

First Transcoding Technique 351

Referring now to FIG. 5, it shows the crawling protection system 10 using a first transcoding technique 351 of the present invention. According to this illustrative example, either or both the crawler 305 and the browser (or graphic user interface. GUI) 310 send queries to the web server 15. In response to these queries, the web server 15 retrieves the desired data from the data sources or repository 320.

The web server 15 prepares the original web form 400 in a predetermined language, such as HTML, XML, or another equivalent language. The original web form 400 contains the content data and the structure or format in which the data will be presented to the user, regardless of whether the user is the crawler 305 or the browser 310. Typically, but not necessarily, the data format will be a column, row, or table 405. The example illustrated in FIG. 5 shows a price column 405 containing three rows.

The transcoding proxy 315 applies a transformation algorithm, also referred to herein as a first transcoding technique 351 to the original web form 400, to generate a manipulated web form 410. The web server 15 sends the same manipulated web form 410 to both the crawler 305 and the browser 310. However, this same form 410 will be unusable by the crawler 305, but will remain readable and browsable by the browser 310.

To this end, the first transcoding technique 351 involves dynamically changing the structure of the web form 400. Certain crawlers 305 extract data by searching the web page for specific HTML elements and use them as anchors. For example, the crawler 305 can search for, and use the third table, fifth row, second column as anchors. This crawling technique will cause the search to fail or to produce invalid results since the transcoding technique modifies the page structure every time a web server sends the page to the user (i.e., crawler 305, browser 310). In one embodiment, existing tables can be nested further, empty tables, rows or columns can be inserted, and/or simple lists can be replaced by tables.

In the present example, the original web form 400 includes a column of sensitive data information, namely the price data column 405. The transcoding proxy 315 transforms the original web form 400 into the manipulated web form 410, using the transcoding technique 351. According to a specific implementation, the transcoding technique 351 modifies the structure of the original price data column 405, but not its content, by, for example, automatically inserting an invisible character or string of characters, such as a blank line or space (also referred to herein as "structure inserts" 420.

As used herein, "content" refers to the substantive data contained in the original web form 400, and embedded within the language used by the web server 15, e.g. HTML. The content will be rendered visible to a user by means of the browser 310. "Structure" refers to the instructions from the web server 15 to the browser 310, directing the latter to layout the content data according to a specific format. In regular use, the structure itself is not usually visible to the user. The crawler 305 typically uses the structure of a web page, would it be the original web form 400 or the manipulated web form 410, to interpret (locate or parse) the content data.

The modification to the original web form 400 can be accomplished using, for example a syntax change to the language (i.e., HTML, XML, etc.) in which the original web form 400 is written. The resulting transcoded price data column is referenced by 405T, and includes the same price data column 405 but moved to a different position, i.e., relocated, so that the data column 405 is more difficult to be automatically located by the crawler 305. In essence, the price data will be "hidden" from the crawler 305. This structure manipulation will not affect the browser's ability to render and display the manipulated web form 410 (or the transcoded price column 405T), as the content data remain unaffected by the transcoding process. However, such structure change will impede the crawler's ability to interpret the content data. It should be noted that the data in the price data column 405 will be sent to the crawler 305, but will be rendered unusable, or very difficult to extract.

According to one embodiment, the transcoding technique 351 permutates all the data in the original web form 400 as described earlier. According to another embodiment, the transcoding technique permutates only selected data structures, such as price data columns, but not the remaining data. To this end, the web server 15 would need to pre-identify the sensitive data to be protected. According to yet another embodiment, the transcoding proxy 315 adds a fixed structure insert, such as a single row 420. However, according to still another embodiment, the transcoding proxy 315 randomly changes among the various structure inserts available to it. For example, the transcoding proxy 315 inserts one blank row 420 in the first data column, and inserts two blank rows 420 in the second data column, and so forth.

The transcoding technique 351 can be implemented using various alternatives. For example, the transformation of the original web form 400 can be done randomly or systematically. The data can be moved vertically and/or horizontally. Table nesting (i.e., a table with in a table) can also be used to "hide" the data.

Second Transcoding Technique 352

Figure 6:
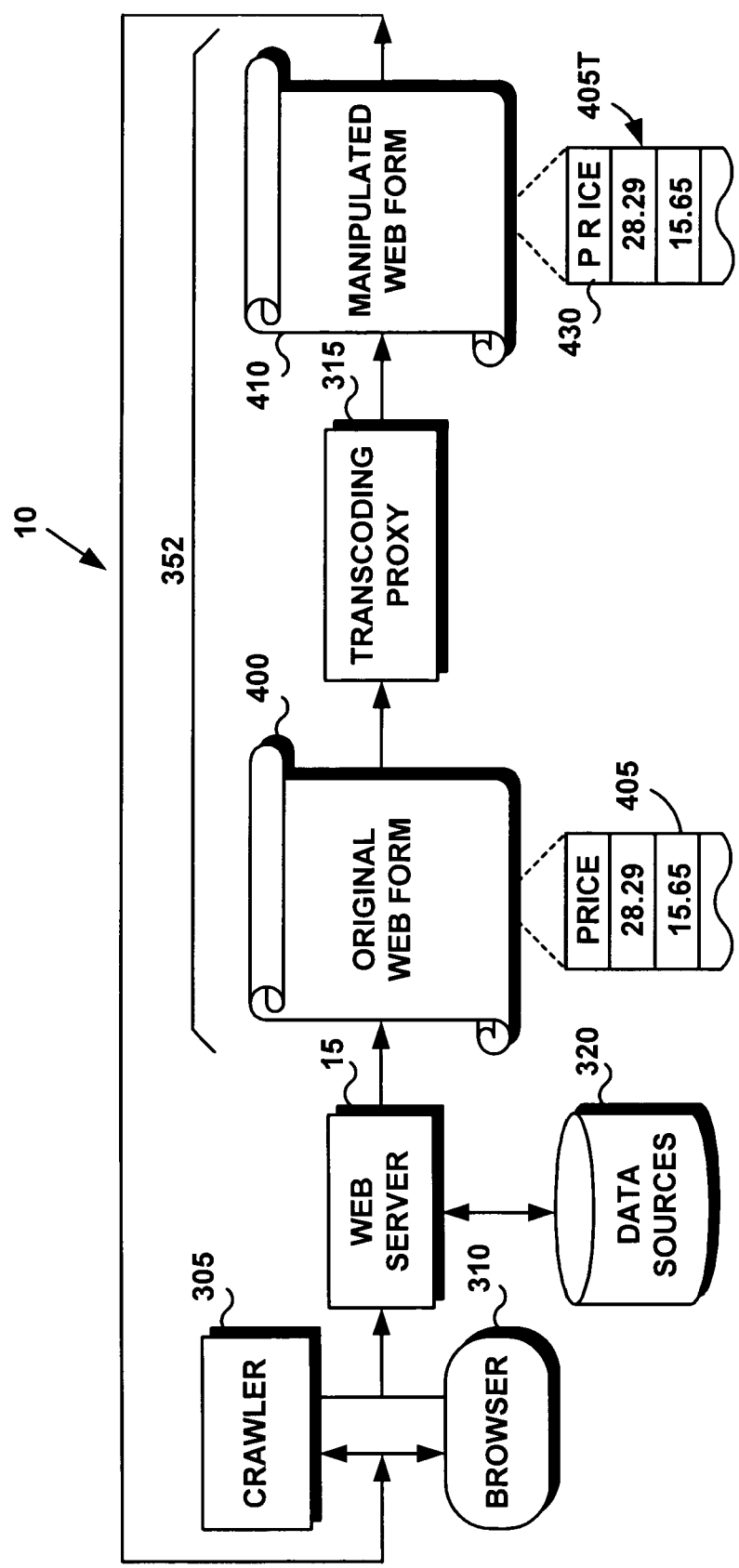
FIG. 6 is a block diagram of the crawling protection system of FIGS. 1 and 3, shown using a second transcoding technique according to the present invention.

Referring now to FIG. 6, it shows the crawling protection system 10 using a second transcoding technique 352 of the present invention. Similarly the foregoing description of FIG. 5, either or both the crawler 305 and the browser 310 send queries to the web server 15. In response to these queries, the web server 15 retrieves the desired data from the data sources or repository 320.

The web server 15 prepares the original web form 400 that contains the retrieved or content data and the structure in which the data will be presented to the user. In this example, the data will be rendered in a data column, row, or table 405. The example of FIG. 6 shows a price column 405 containing three rows.

The transcoding proxy 315 applies a transformation algorithm, also referred to herein as a second transcoding technique 352 to the original web form 400, to generate the manipulated web form 410. The web server 15 sends the same manipulated web form 410 to both the crawler 305 and the browser 310. However, this same form 410 will be unusable by the crawler 305, but will remain readable and browsable by the browser 310.

To this end, the second transcoding technique 352 involves dynamically changing the content of the web form 400 but not its structure. Certain crawlers 305 extract data by searching a web page for a keyword or phrase, which in this example is "Price". Then, using the location of this keyword or phrase as an anchor, the crawlers 305 extract the content data of interest, such as price value.

This transcoding technique 352 inserts characters, images, a string of characters or images, or otherwise data (referred to herein as "content inserts") that are invisible or substantially imperceptible to the user, between the letters of the keyword or phrase to prevent automatic keyword searching by the crawler 305. For instance, a crawler search for the keyword "price" would fail if this term were replaced by the following string: "P<img src=empty.gif height=1 width=1>rice", which effectively inserts a blank space between the letter "P" and the subsequent letter "r", so that the word spells "P rice" 430. The space inserted between the letter "P" and the letter "r" in "Price" is imperceptible by the user, and could be rendered more so with a proper choice of the font in which the web page is rendered to the user.

This transcoding technique 352 can modify the original web form 400 on the fly by adding one or more invisible content inserts at random locations in selected keywords of interest that could lead to sensitive content data if used as anchors. This will produce a slightly different visual effect every time the web page or the server 15 is accessed. Slight deviations in the visual appearance of the page would be acceptable particularly that users will not notice or even pay attention to these deviations. In addition, the visual appearance of a web site is bound to be slightly different on different browsers.

This content manipulation will not affect the browser's ability to render and display the manipulated web form 410 (or the transcoded price column 405T), as the structure remains unaffected by the transcoding process, and the content data are unaltered except for the invisible inserts. However, these content inserts will impede the crawler's ability to automatically extract the content data since it prevents the crawler 305 from locating the desired keywords, effectively "blanking" the content data associated with these keywords. It should be noted that the data in the price data column 405 will be sent to the crawler 305, but will be rendered unusable, or very difficult to extract.

According to one embodiment, the transcoding technique 352 permutates all the keywords in the original web form 400 using one or more different content inserts. According to another embodiment, the transcoding technique permutates only selected keywords. According to yet another embodiment, the transcoding proxy 315 inserts a fixed content insert, such as a single space. However, according to still another embodiment, the transcoding proxy 315 randomly selects among various content inserts available to it. For example, the transcoding proxy 315 inserts one space in a first keyword, and inserts an image in the second keyword, and so forth.

The transcoding technique 352 can be implemented using various alternatives. For example, the transformation of the original web form 400 can be done randomly or systematically.

Third Transcoding Technique 353

Figure 7:
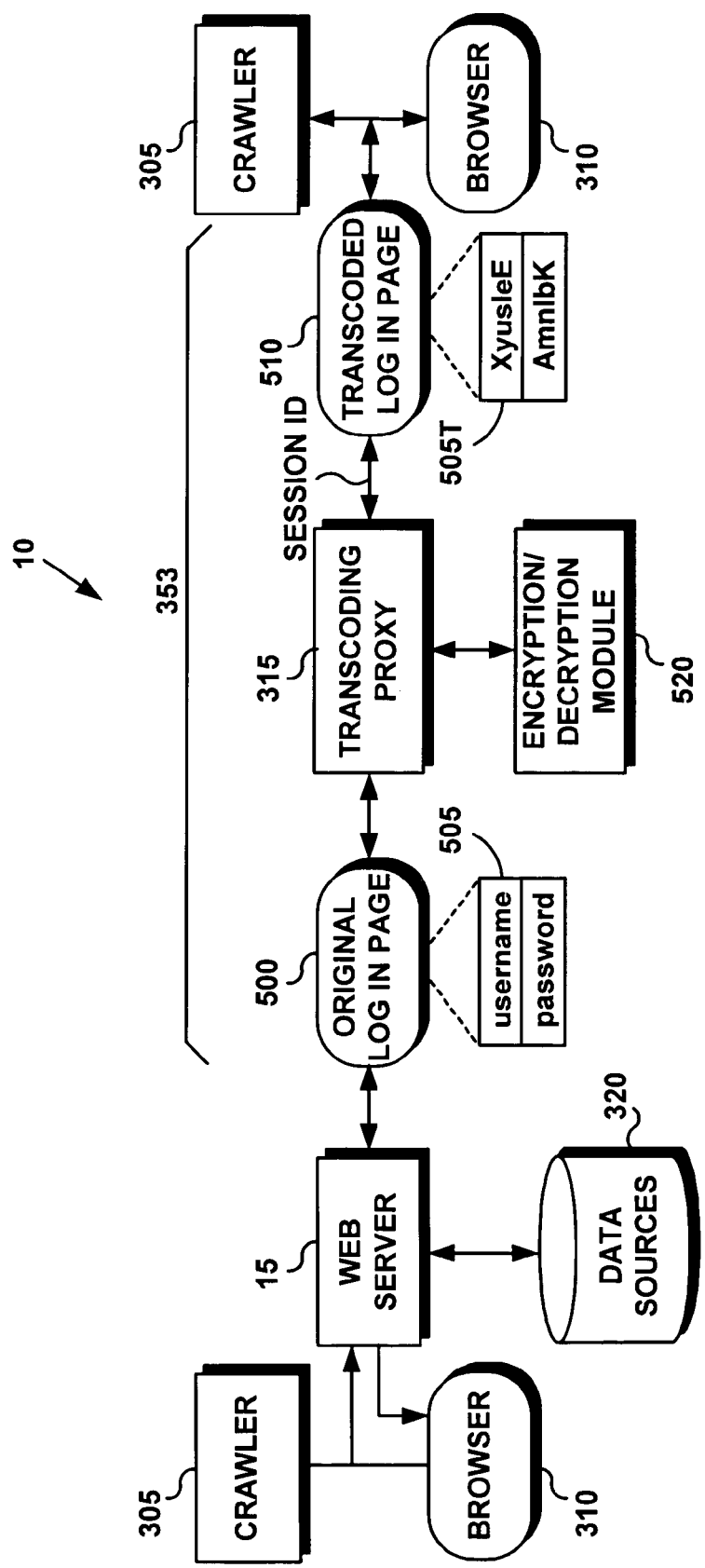
FIG. 7 is a block diagram of the crawling protection system of FIGS. 1 and 3, shown using a third transcoding technique according to the present invention.

Referring now to FIG. 7, it shows the crawling protection system 10 using a third transcoding technique 353 of the present invention. Either or both the crawler 305 and the browser 310 start by accessing the web server 15 that returns a log in page or form 500 to the requesting crawler 305 or browser 310. The log in page 500 typically includes one or more variables, each of which is comprised of a variable name 505 and a variable value. Conventionally, the crawler 305 or the browser (e.g. user) 310 fills in the variable values and submits the completed log in page 500 back to the web server 15. The web server 15 validates the variable names and values in the log in page 500, and based thereon, retrieves the desired data from the data sources or repository 220 and forwards the retrieved data to the crawler 305 and/or the browser 310.

The transcoding proxy 315 applies a transformation algorithm, also referred to herein as a third transcoding technique 353 to one or more of the variable names 505, to dynamically modify the variable names 505. Certain crawlers 305 submit queries by hard-coding the names of form variables in URLs or the body of a POST message. This is a valid approach because web applications are typically written using static variable names. However, because the transcoding proxy 315 modifies the variable names at every session, the crawlers 305 will fail to log in and thus to access the data in the data sources 320. A session may be established when a user (crawler 305 or browser 310) visits the web site for the first time in a given time interval. Alternatively, every access to the web site may be viewed as a separate session.

In operation, the web server 15 receives a request to access the web site from the crawler 305 and/or the browser 310, and generates the original log in page 500 with the required variables. The example of FIG. 7 illustrates the variables in the original log in page 500 as comprising two variable names 505: "username" and "password". The original log in page 500 also includes placeholders for variable values to be filled in by the user. It should be clear that additional variables can alternatively be used.

The transcoding proxy 315 acts upon, and transforms one or more variable names so that the transformed or synthetic variable names 505T are not automatically recognized by the crawler 305 as the proper names for which the variable values need to be inserted in the transformed log in page 510. In effect, the transcoding proxy 315 "hides" the original variable names 505 from the crawler's view and replaces them with synthetic variable names 505T. The inability of the crawler 305 to recognize the original variable names 505 will prevent it from filling in the variable values in the corresponding placeholders, causing the access to the web server 15 to fail prior to accessing the data in the data sources 320.

However, neither the original variable names 505 nor synthetic variable names 505T are required by the browser 310 to enter the variable values, since they are not displayed by the browser 310. Instead, the browser 310 displays labels that correspond to the original variable names 505 and the placeholders for the variable values. Consequently, the transcoding technique 353 will be transparent to the browser 310 and does not affect the log in process or the log in presentation to the browser 310. Exemplary labels that correspond to the original variable names "username" and "password" are: "User Name" and "Password", respectively. It is these labels that get displayed to the user of the browser 310.

Once the browser user fills in the required variable values and submits the log in page to the browser 15, the latter expects to receive the original variable names 505 as well, and to be able to differentiate the particular user's log in data among various other users. The transcoding proxy 315 addresses and solves these concerns.

To this end, the web server 15 adds a session ID to the web form that can then be extracted and used to compute the synthetic names 505T for the original variable names 505 (block 360 of FIG. 4). It is important that the session ID be passed to the browser 310 and that the browser 310 pass it back to the server 15 when the log in form is submitted. This allows the transcoding proxy 315 to re-compute the original name from the synthetic names 505T (block 365 of FIG. 4). This transcoding technique 353 may require only one key, e.g. the session ID, and assumes that the encoding is symmetric. Alternative schemes can use two or more keys.

The transcoding proxy 315 converts the synthetic variable names 505T to the original variable names 505 using the following process. The transcoding proxy 315 includes an encryption/decryption module 520 that encrypts the original variable names 500 and attaches an encryption key to the encrypted (or transcoded) variable names 505T, in the log in data stream from the web server 15 to the crawler 305 and/or browser 310.

When the browser 310 enters the required variable values and submits the transcoded log in page 510 back to the web server 15, the transcoded log in page 510 is intercepted by the transcoding proxy 315 so that the synthetic variable names 505T are decrypted by the encryption/decryption module 520, back to the original variable names 505 using the same encryption key.

Fourth Transcoding Technique 354

Figure 8:
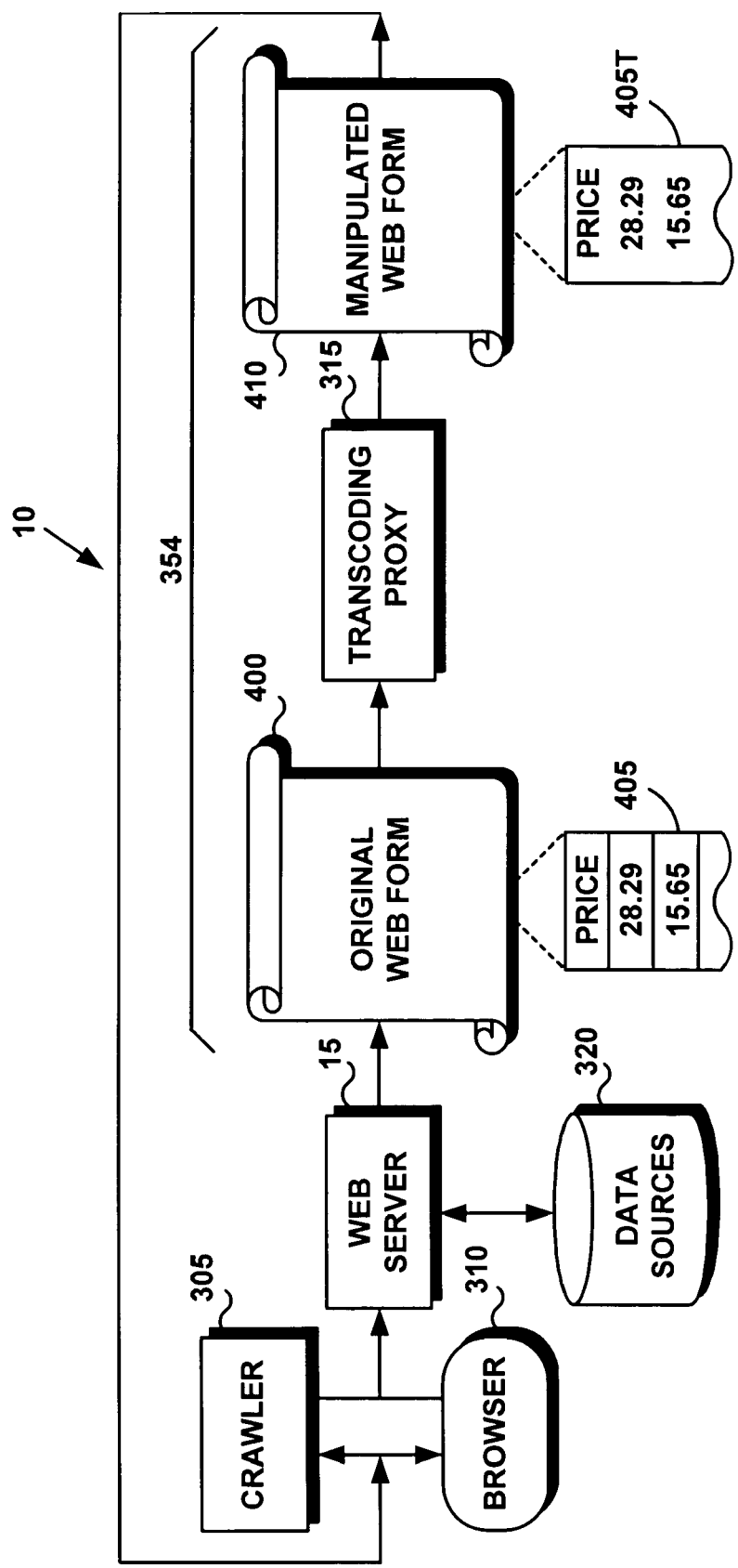
FIG. 8 is a block diagram of the crawling protection system of FIGS. 1 and 3, shown using a fourth transcoding technique according to the present invention.

Referring now to FIG. 8, it shows the crawling protection system 10 using a fourth transcoding technique 354 of the present invention. Either or both the crawler 305 and the browser 310 send queries to the web server 15. In response to these queries, the web server 15 retrieves the desired data from the data sources or repository 320.

The web server 15 prepares the original web form 400 that contains the retrieved or content data and the structure in which the data will be presented to the user. In this example, the data will be rendered in a data column, row, or table 405. The example of FIG. 7 shows a price column 405 containing three rows.

The transcoding proxy 315 applies a transformation algorithm, also referred to herein as a fourth transcoding technique 354 to the original web form 400, to generate the manipulated web form 410. The web server 15 sends the same manipulated web form 410 to both the crawler 305 and the browser 310. However, this same form 410 will be unusable by the crawler 305, but will remain readable and browsable by the browser 310.

To this end, the fourth transcoding technique 354 involves using dynamic images to display text data. Many crawlers exclusively search the textual content of web pages. These crawlers ignore inline images, even when these images contain critical text elements. According to this protection technique, the transcoding proxy 315 alters the HTML content of the original web form 400 by replacing text elements, i.e., the price column 405, with their image counterparts on the fly. The resulting manipulated web form 410 is readable by the browser 310, but not by the crawler 305 due to the crawler's inability to detect and the text elements that have been converted into images or to another similar format not readily recognizable by the crawler 305.

Fifth Transcoding Technique 355

Figure 9:
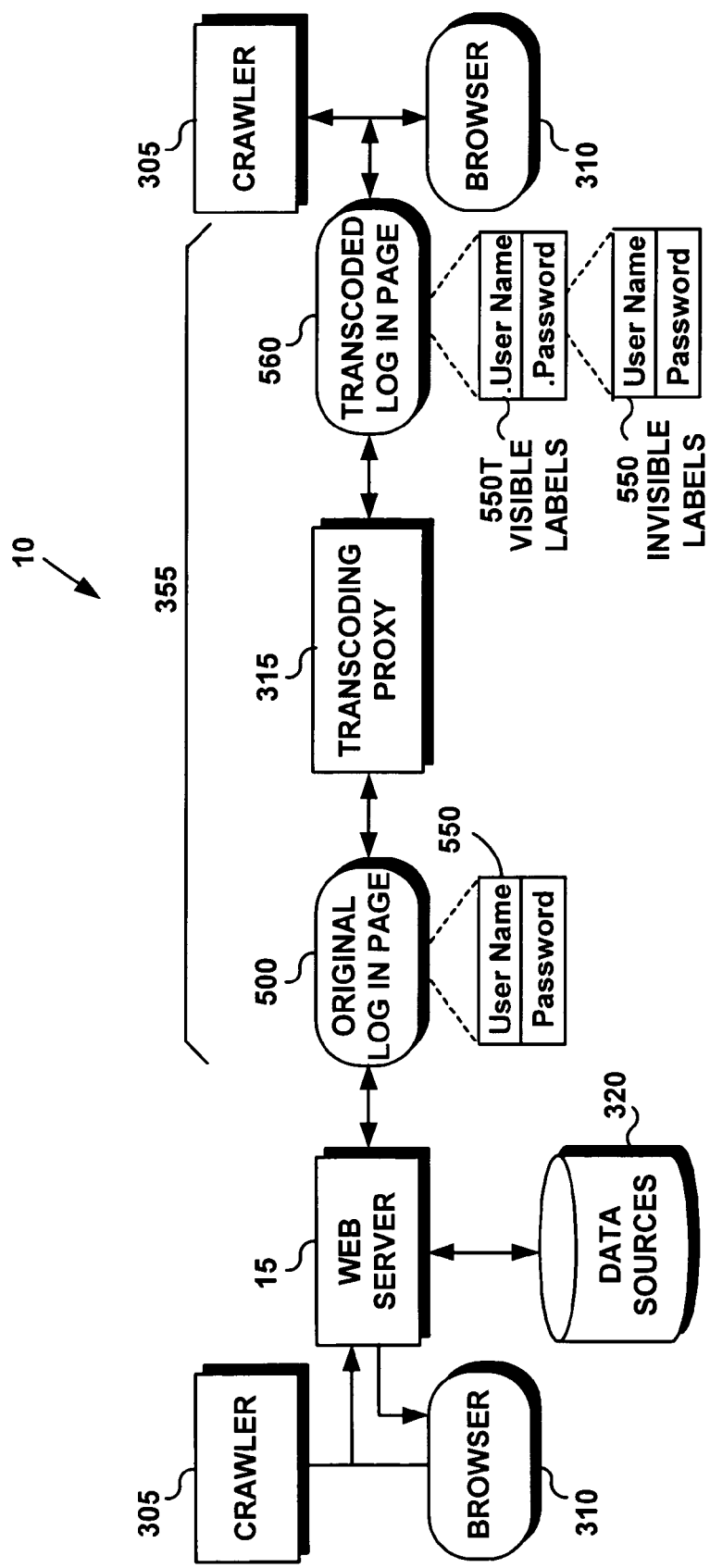
FIG. 9 is a block diagram of the crawling protection system of FIGS. 1 and 3, shown using a fifth transcoding technique according to the present invention.

Referring to FIG. 9, it shows the crawling protection system 10 using a fifth transcoding technique 355 of the present invention. Either or both the crawler 305 and the browser 310 start by accessing the web server 15 that returns a log in page or form 500 to the requesting crawler 305 or browser 310. The log in page 500 typically includes variable labels 550 and corresponding variable names 505 (FIG. 7) and variable values. Conventionally, the crawler 305 or the browser (e.g. user) 310 fills in the variable values that correspond to the labels 550, and submits the completed log in page 500 back to the web server 15. The web server 15 validates the variable names and values in the log in page 500, and based thereon, retrieves the desired data from the data sources or repository 320 and forwards the retrieved data to the crawler 305 and/or the browser 310.

The transcoding proxy 315 applies a transformation algorithm, also referred to herein as a fifth transcoding technique 355 to dynamically alter the form variable values entered by the user (e.g. the crawler 305, or the browser 310). This transcoding technique 355 involves using an executable application such as JavaScript® to dynamically alter the form variable values. Many crawlers exclusively search the static HTML code of the web page. According to the present transcoding technique 355, pages that contain forms whose variables are initialized or calculated dynamically by a JavaScript® code cannot be effectively crawled because the JavaScript® code would have to be executed by the crawler 305, in order for the correct values to appear in the form variables. Certain crawlers might include hard-coded rules for finding variable initialization statements in the JavaScript® code and thereby determining the correct values for the form variables. For these latter crawlers, the third transcoding technique 353 described above, can be used to prevent the crawlers from functioning properly.

In operation, the web server 15 receives a request to access the web site from the crawler 305 and/or the browser 310, and generates the original log in page 500 with the required labels and variables. The example of FIG. 9 illustrates two labels 550 contained in the original log in page 500: "User Name" and "Password". The original log in page 500 also includes placeholders for variable values to be filled in by the user. It should be clear that additional variable labels can alternatively be included in the original log in page 500.

The transcoding proxy 315 acts upon, and transforms one or more labels 550 so that the new transformed or synthetic labels 550T become visible to the browser 310. The original labels 550 though still contained in the transcoded log in page 560 are not visible to the user of the browser 310, but are still detectable by the crawler 305.

The crawler 305 enters the variable values corresponding to the original labels 550 and submits these values to the server 15. However, this submission is intercepted by the transcoding proxy 315, which, using a programming or executable application, such as JavaScript®, overwrites the values entered by the crawler 305 in the original variables. This occurs because the proxy is programmed to copy values from the synthetic variables 550T into the original ones 550. This process results in blank or incorrect values to be submitted to the web server 15, which, upon seeing blank or incorrect variable values, denies crawler access to its data sources 320. The browser 310 on the other hand, enters the variable values that are assigned to the visible, transformed or synthetic labels 550T and submits the transcoded log in page 560 to the transcoding proxy 315. The programming application, i.e., JavaScript®, residing in the transcoding proxy 315, copies the variable values entered by the browser 310 and assigns them to the original labels 550. The transcoded log in page 560, with the correct variable values corresponding to the original labels 550 are then submitted to the web server 15, authorizing browser access to the data sources 320.

Sixth Transcoding Technique 356

Figure 10:
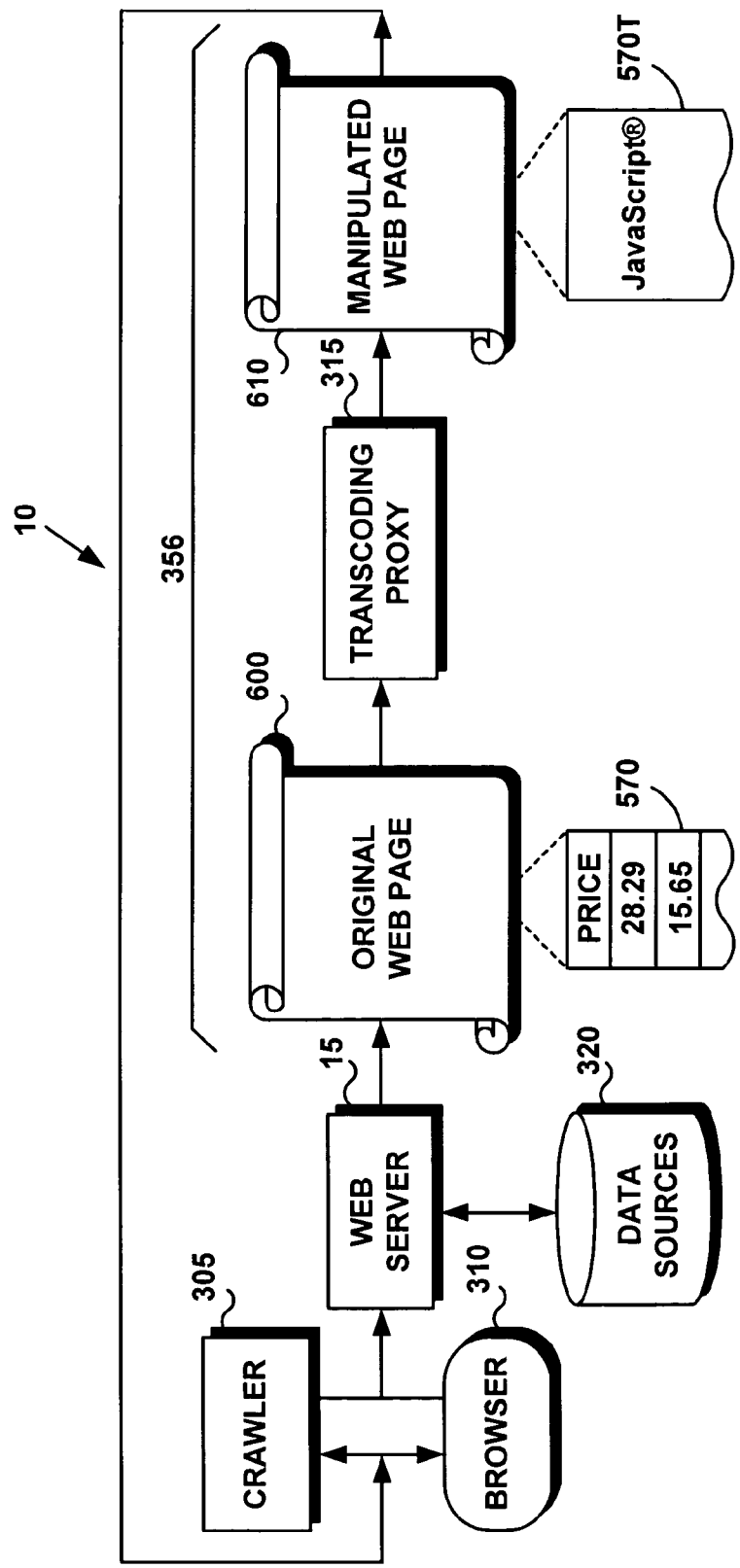
FIG. 10 is a block diagram of the crawling protection system of FIGS. 1 and 3, shown using a sixth transcoding technique according to the present invention.

Referring now to FIG. 10, it shows the crawling protection system 10 using a sixth transcoding technique 356 of the present invention. Either or both the crawler 305 and the browser 310 send queries to the web server 15. In response to these queries, the web server 15 retrieves the desired data from the data sources or repository 320.

The web server 15 prepares the original web form 400 that contains the retrieved or content data and the structure in which the data will be presented to the user. In this example, the data is shown rendered in a data column or table 570.

The transcoding proxy 315 applies a transformation algorithm, also referred to herein as a sixth transcoding technique 356 to the original web form 570, to generate the manipulated web form 570T. The web server 15 sends the same manipulated web form 410 to both the crawler 305 and the browser 310. However, this same form 410 will be unusable by the crawler 305, but will remain readable and browsable by the browser 310.

To this end, the sixth transcoding technique 354 involves using an executable application such as JavaScript® to dynamically generate the web page to be displayed by the browser 310. Many robots exclusively search the static HTML code of the web page. According to this technique, a web server can alter the HTML content of the web page by replacing the static HTML code with JavaScript® code fragments that, for example, "print" the HTML content when executed. Alternatively, the HTML content of the web page can be encrypted by the server and decrypted by the JavaScript® code.

The resulting manipulated web form 410 is readable by the browser 310, but not by the crawler 305 due to the crawler's inability to allow the programming application to be executed, while the browser 310 would allow the execution of the application.

In operation, the web server 15 receives a request to access the web site from the crawler 305 and/or the browser 310, and generates the original web page 600 with the requested data 570 retrieved from the data sources 320. The transcoding proxy 315 acts upon, and transforms the original web page 600 into a manipulated web page 610.

The transcoding proxy 315 converts the structure and content of the original web page 600 which is written in a specific language, such as HTML code, to an executable application, such as JavaScript®, which, when executed, renders the original HTML code. While the same manipulated web page 610 is sent to the crawler 305 and/or the browser 310, the crawler 305 is incapable of recognizing the manipulated web page 610 prior to the execution of the JavaScript® code. In effect, the transcoding proxy 315 replaces the static content and/or structure of the original web page 600 with a dynamic or executable content and/or structure.

In a simplest form, the JavaScript® code can instruct the browser 310 to "write" the HTML content of the original web page 600, thus rendering visible to the user of the browser 310. To this end, the HTML code is embedded in the JavaScript® code, and the execution instructions of the JavaScript® code will recreate the original HTML code.

It is to be understood that the specific embodiments of the invention that have been described are merely illustrative of certain application of the principle of the present invention. Numerous modifications may be made to the crawling protection techniques and associated methods described herein, without departing from the spirit and scope of the present invention. Moreover, while the present invention is described for illustration purpose only in relation to the WWW, it should be clear that the invention is applicable as well to databases and other tables with indexed entries.

What is claimed is:

1. A system for preventing automated crawler access to data from a network-based data source, comprising:
    a transcoding proxy for automatically permutating data retrieved from the data source, to render the data uninterpretable by the crawler, while allowing a browser to render data retrieved from the data source;
    wherein the transcoding proxy utilizes a transcoding technique that dynamically changes a form structure;
    wherein the transcoding technique changes the form structure by shifting the position of the data in the form;
    wherein the transcoding technique shifts the position of form data by inserting any one or more of: a character, a string of characters, a space, non-textual data, a blank row, a blank column, and/or an empty table; and
    wherein the transcoding technique shifts the position of form data by nesting the data in a table within a table.

2. The system according to claim 1,
    wherein the transcoding proxy concurrently permits a browser to access the data source.

3. The system according to claim 1, wherein the transcoding proxy utilizes a transcoding technique that dynamically changes a form content.

4. The system according to claim 1, wherein the data retrieved from the data source include a variable with a name; and
    wherein the transcoding proxy utilizes a transcoding technique that dynamically changes the name of the variable.

5. The system according to claim 1, wherein the data retrieved from the data source include a textual content; and
    wherein the transcoding proxy utilizes a transcoding technique that dynamically changes the textual content into non-textual content.

6. The system according to claim 5, wherein the transcoding technique replaces the textual content by a corresponding image, in order to render selected terms difficult to be searched automatically by the crawler.

7. The system according to claim 1, wherein the data retrieved from the data source includes a form containing a variable with a value;
    wherein the transcoding proxy utilizes a transcoding technique that incorporates an executable application in the form; and
    wherein when the executable application is implemented, it dynamically alter the value of the variable.

8. The system according to claim 7, wherein the variable includes a label associated with the variable;
    wherein the transcoding technique further transforms the label into a synthetic label; and
    wherein the executable application recalculates the variable value in order to prevent a server from authenticating the crawler access to the data source.

9. The system according to claim 1, wherein the data retrieved from the data source is collected in a page;
   wherein the transcoding proxy utilizes a transcoding technique that incorporates an executable application in the page; and
   wherein when the executable application is implemented, it dynamically generates the page and renders the data.

10. The system according to claim 9, wherein the transcoding technique renders the data using an HTML code.

11. A system for preventing automated crawler access to data from a network-based data source, comprising:
   a transcoding proxy for automatically permutating data retrieved from the data source, to render the data uninterpretable by the crawler, while allowing a browser to render data retrieved from the data source;
   wherein the transcoding proxy utilizes a transcoding technique that dynamically changes a form content; and
   wherein the transcoding technique changes the form content by adding one or more content inserts that are substantially imperceptible to a browser user, in order to render selected terms in the page content difficult to be searched automatically by the crawler.

12. The system according to claim 11, wherein the content inserts include any one or more of: a characters, a string of characters, non-textual data, and/or a string of images.

13. The system according to claim 12, wherein the transcoding technique calculates a synthetic name from a variable name, and replaces the variable name with the synthetic name, in order to render selected terms difficult to be searched automatically by the crawler.

14. The system according to claim 13, wherein the variable is contained in a data entry form;
   wherein the data entry form further includes a session ID; and
   wherein the transcoding technique recalculates the variable name from the synthetic name to enable the data to be rendered by the browser.

15. A method for preventing automated crawler access to data from a network-based data source, comprising the steps of:
   automatically permutating data retrieved from the data source, to prevent a crawler from automatically accessing the data source by rendering the data uninterpretable by the crawler, while allowing a browser to render data retrieved from the data source; and
   utilizing a transcoding technique that dynamically changes a form structure;
   wherein the transcoding technique changes the form structure by shifting the position of the data in the form; and
   wherein the transcoding technique shifts the position of form data by nesting the data in a table within a fable.

16. The method according to claim 15, wherein the data contain any one or more of: a variable with a name, a textual content, or a value;
   wherein the data are collected in one or more of: a form or a page; and
   wherein automatically permuting data and preventing crawler access include using one or more of the following transcoding techniques:
   a first transcoding technique that dynamically changes a form structure;
   a second transcoding technique that dynamically changes a form content;
   a third transcoding technique that dynamically changes the name of the variable;
   a fourth transcoding technique that dynamically changes the textual content into a non-textual content;
   a fifth transcoding technique that incorporates an executable application in the form, and wherein when the executable application is implemented, it dynamically alter the value of the for variable; and/or
   a sixth transcoding technique that incorporates an executable application in the page, and wherein when the executable application is implemented, it dynamically generates the page and renders the data.

17. A system for preventing automated crawler access to data from a network-based data source, comprising:
   a transcoding proxy for automatically permutating data retrieved from the data source, to render the data uninterpretable by the crawler, while allowing a browser to render data retrieved from the data source;
   wherein the transcoding proxy utilizes a transcoding technique that dynamically changes a form structure;
   wherein the transcoding technique changes the form structure by shifting the position of the data in the form; and
   wherein the transcoding technique shifts the position of form data by nesting the data in a table within a table.

18. A computer program product including a plurality of executable instruction codes stored on a computer readable medium, for preventing automated crawler access to data from a network-based data source, comprising:
   a first set of instruction codes for automatically permutating data retrieved from the data source, to render the data uninterpretable by the crawler, while allowing a browser to render data retrieved from the data source;
   a second set of instruction codes for dynamically changing a form structure;
   wherein the second set of instruction codes changes the form structure by shifting the position of the data in the form; and
   wherein the second set of instruction codes shifts the position of form data by nesting the data in a table within a table.

* * * * *